H. FORD.
DASH ASSEMBLY AND CONTROLLING DEVICE.
APPLICATION FILED JULY 17, 1918.

1,387,147.

Patented Aug. 9, 1921.
2 SHEETS—SHEET 1.

Witness
Chas. W. Stauffiger
Karl H. Butler

Inventor
Henry Ford,
By
Attorneys

H. FORD.
DASH ASSEMBLY AND CONTROLLING DEVICE.
APPLICATION FILED JULY 17, 1918.
1,387,147.
Patented Aug. 9, 1921.
2 SHEETS—SHEET 2.
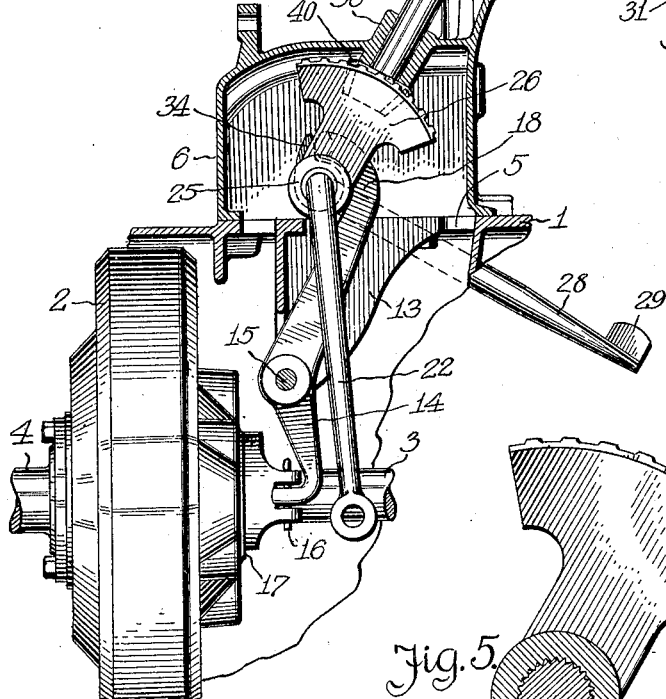
Fig. 2.
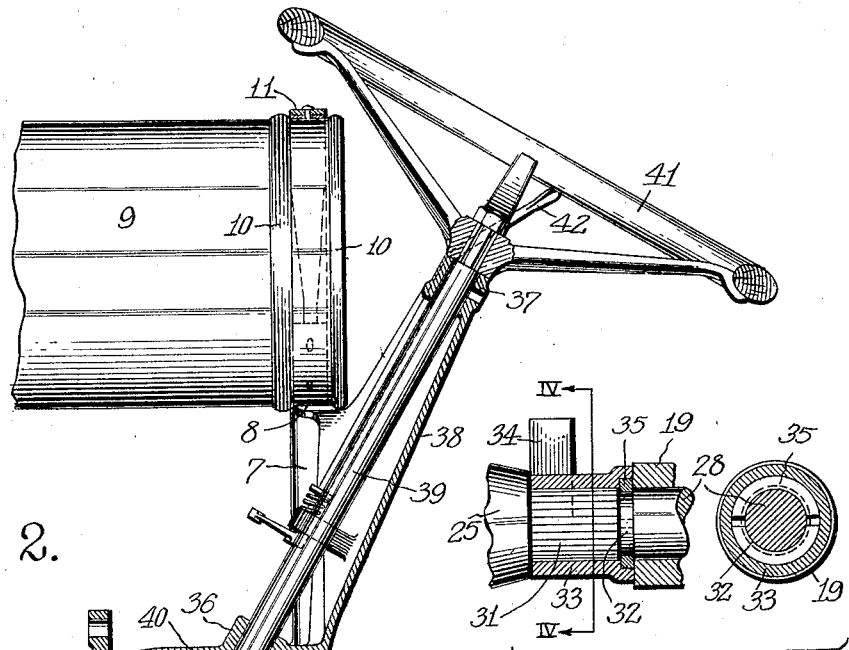
Fig. 3.
Fig. 4.
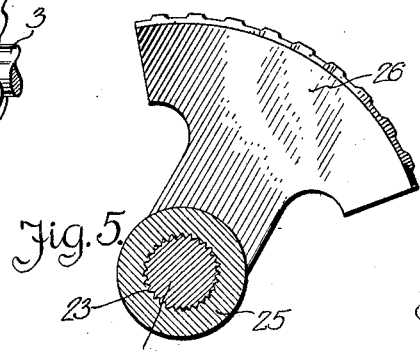
Fig. 5.
Witness
Chas. W. Stauffiger
Karl H. Butler
Inventor
Henry Ford,
By
Attorneys

UNITED STATES PATENT OFFICE.

HENRY FORD, OF DEARBORN, MICHIGAN.

DASH-ASSEMBLY AND CONTROLLING DEVICE.

1,387,147. Specification of Letters Patent. Patented Aug. 9, 1921.

Application filed July 17, 1918. Serial No. 245,427.

*To all whom it may concern:*

Be it known that I, HENRY FORD, a citizen of the United States of America, residing at Dearborn, in the county of Wayne and State of Michigan, have invented certain new and useful Improvements in Dash-Assembly and Controlling Devices, of which the following is a specification, reference being had therein to the accompanying drawings.

This invention relates to a dash assembly and controlling devices for a tractor, and the invention aims to provide a dash of novel design that will serve as the support of the rear end of a fuel tank, a steering post or column, a clutch control and the various regulating devices or appurtenances that are essential for a tractor and should be accessible to the operator of the tractor.

The invention further aims to provide a dash assembly, which as a unit, may be easily and quickly installed relative to a tractor chassis, and in this manner contribute to an expeditious and economical construction of tractors.

The invention will be hereinafter considered and then claimed, and reference will now be had to the drawings, wherein—

Fig. 2 is a vertical longitudinal sectional view of the same;

Fig. 3 shows enlarged detailed sectional views of a connection between the clutch shaft and steering mechanism;

Fig. 4 is a cross sectional view taken on the line IV—IV of Fig. 3, and

Fig. 5 is a similar view taken on the line V—V of Fig. 1.

Figure 1:
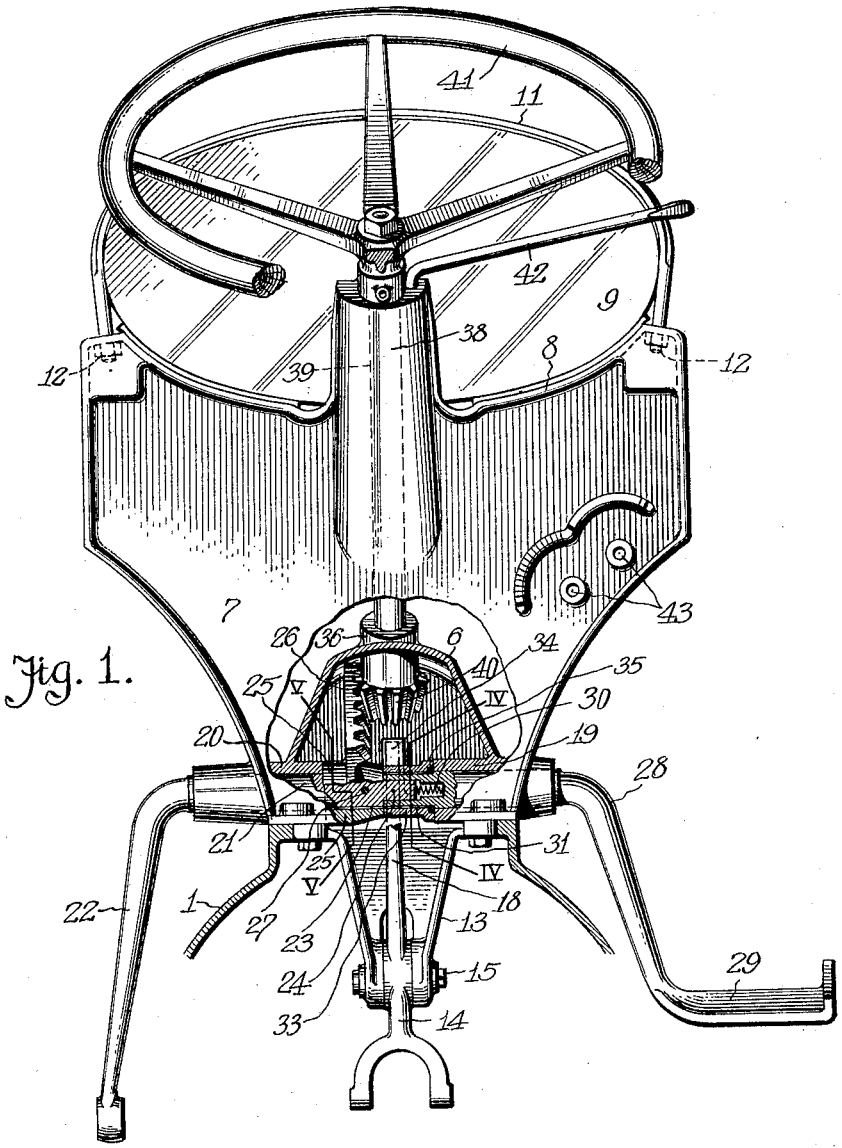
Figure 1 is a front elevation of the dash assembly, partly broken away and partly in section.

In the drawings, the reference numeral 1 denotes a portion of the tractor chassis or transmission casing for a clutch 2 which controls the operation of a transmission shaft 3 by an engine shaft 4, and the top of the casing 1 has an opening 5 so that a clutch controlling device may extend into the transmission casing and through the medium of the clutch 2 control the operation of the tractor by its power plant.

Mounted on the transmission casing 1, over the opening 5, is a small housing 6 integral with a dash 7, said dash being at the forward end of the housing, in a vertical plane relative thereto, and somewhat fantailed shaped in elevation. The upper end of the dash is of sufficient width and shape so as to afford a concave seat 8 for the rear end of a fuel tank 9, said tank being oval in cross section with its rear end beaded, as at 10, and provided with a strap 11. The strap 11 has its ends connected to the side edges of the dash 7, as at 12, thus rigidly holding the rear end of the fuel tank relative to the dash and transmission casing 1.

The lower end of the dash 7 is reduced in width so as to meet the top of the transmission casing 1 and be braced relative thereto by the forwardly extending housing 6.

Connected to the bottom of the housing 6, so as to be removable therewith, is a bifurcated hanger or depending clutch lever bracket 13, said bracket extending in proximity to the clutch 2 and having a clutch lever 14 pivoted in the lower end thereof, as at 15. The lower end of the clutch lever 14 is loosely connected, as at 16, to the clutch release plate 17 of the clutch 2, and the upper end of the lever 14 extends into the housing 6 and has a hooked end 18.

The housing 6, above the bracket 13, has transversely alining bearings 19 and 20 and journaled in the bearing 20 is a rear steering arm 21 that has a crank portion 22 outside of the transmission casing 1 and adapted for connection with the steering parts of the tractor front axle assembly (not shown). The inner end of the rear steering arm 21 has a fluted portion 23, and a reduced end 24. Fitted on the fluted portion 23 of the arm 21 is a hub 25 of a sector gear 26, the hub 25 confronting the inner end of the bearing 20, and held against longitudinal displacement by a pin 27 or other fastening means.

Journaled in the bearing 19 of the housing 6 is a clutch pedal 28 having a tread portion or foot piece 29 outside of the transmission casing 1. The inner end of the clutch pedal 28 is bored out to receive the reduced end 24 of the arm 21, such arrangement coöperating with the bearings 19 and 20 in maintaining the inner end of the arm 21 and the pedal 28 in alinement, yet permitting of one being rocked independent of the other. A small compression spring 30 is placed in the inner end of the pedal 28 and the expansive force of this spring is sufficient to maintain the inner ends of the arm 21 and the pedal 28 in proper relation to each other. The inner end of the pedal 28 has a fluted portion 31 and an annular groove 32, best shown in Figs. 3 and 4. On the fluted portion 31 of the pedal is fitted the hubs 33 of a clutch pedal cam 34, and said cam normally engages the hooked end 18 of the clutch lever 14, as shown in Fig. 2.

A split or two-part locking ring 35 is placed in the annular groove 32, said ring coöperating with the cam hub 33 and the bearing 19 in preventing longitudinal displacement of the clutch pedal 28.

The top of the housing 6 has a bearing 36 alining with a bearing 37 carried by an angularly disposed steering column 38 forming part of the dash 7, and journaled in the bearings 36 and 37 is a steering shaft 39. The lower end of the steering shaft 39 has a beveled gear 40 meshing with the sector gear 26 and the upper end of the steering shaft 39 has a suitable steering wheel 41.

The steering column 38 affords a support for a throttle control handle 42, and the dash 7 has provision, for instance as at 43, for spark levers, adjusting rods, and other controlling devices.

From the foregoing, it will be observed that the invention is characterized by a dash which affords a support for the rear end of a fuel tank and clutch and steering mechanisms, said mechanisms being assembled relative to the dash so that as a unit, it may be easily and quickly mounted on the transmission casing 1 and then the fuel tank connected thereto. By providing the inner ends of the steering arm and clutch pedal with fluted portions, the sector gear of the steering mechanism and the cam of the clutch mechanism can be accurately positioned for proper engagement with the beveled gear of the steering shaft and the hooked end of the clutch lever. The clutch maintains the clutch lever firmly in engagement with the cam and the pedal normally elevated, so it is only necessary to depress the pedal to actuate the clutch lever to disengage the clutch and permit of the engine shaft 4 operating independently of the transmission shaft 3, when the engine is in operation.

What I claim is:—

1. A dash assembly for tractors comprising a housing adapted for mounting on a transmission casing, a steering arm journaled therein and extending at one side of the transmission casing, a clutch pedal journaled in said housing and extending at the opposite side of said transmission casing, a dash carried by said housing, and steering means on said dash for said steering arm.

2. A dash assembly for tractors comprising a housing adapted for mounting on a transmission casing, a bracket carried by said housing adapted to extend into the transmission casing, a clutch lever supported by said bracket, a steering arm journaled in said housing and extending at one side of the transmission casing, a clutch pedal journaled in said housing and extending at the opposite side of said transmission casing and adapted for actuating said clutch lever, a dash carried by said housing, and steering means on said dash for said steering arm.

3. A dash assembly for tractors comprising a housing, a dash carried thereby and adapted for supporting an end of the fuel tank, and steering and clutch operating means extending through said housing.

4. A dash assembly for tractors comprising a housing, a dash carried thereby adapted for supporting the end of a fuel tank, a clutch lever supported from said housing, a steering arm supported by said housing, and steering and clutch operating means for said lever and said arm.

5. A dash assembly for tractors comprising a housing, a dash carried thereby adapted for supporting an end of a fuel tank, a steering arm extending into said housing, a clutch pedal extending into said housing and having its inner end rotatably supporting the inner end of said steering arm, a clutch lever supported by said housing adapted to be actuated by said clutch pedal, and steering means on said dash for said steering arm.

6. The combination of a transmission casing, a tank above said casing, a clutch in said casing, and a dash assembly on said casing and bodily removable therefrom and including a seat for said tank and operating means for said clutch.

7. The combination with a transmission casing, a tank above said casing, a clutch in said casing, and a dash assembly on said casing and bodily removable therefrom and including a seat for said tank, operating means for said clutch, and a steering mechanism.

8. A dash assembly comprising a housing, a bracket carried thereby, a clutch releasing lever carried by said bracket, a cam in said housing adapted to actuate said lever, and a clutch pedal extending into said housing adapted to operate said cam.

9. A dash assembly comprising a housing, a bracket carried thereby, a clutch releasing lever carried by said bracket, a cam in said housing adapted to actuate said lever, a clutch pedal extending into said housing adapted for operating said cam, a steering arm extending into said housing and having its inner end journaled in said clutch pedal, and means extending into said housing and adapted for actuating said steering arm.

10. In a tractor, the combination of a chassis, a constantly exposed fuel tank longitudinally of said chassis, and a dash having a seat at the upper end thereof for an end of said tank with the end of the tank terminating approximately in the plane of the dash, and the lower end of the dash reduced to rest on said chassis and be secured thereto.

11. As a new article of manufacture for tractor, a dash having an integral steering column centrally thereof and adapted to have a steering shaft journaled therein.

12. As a new article of manufacture for tractor, a dash having an integral steering column on one side thereof and an integral housing on the other side thereof, with the steering column wholly in a plane above the top of the housing.

13. A dash assembly for motor driven vehicles or tractors, in which the dash is carried by a housing adapted to be mounted upon the transmission casing or other convenient part of the vehicle chassis, and in which steering mechanism and clutch operating mechanism extend into and are operatively supported by said housing.

14. A dash assembly as set forth in claim 13, wherein the steering mechanism includes a steering arm journaled in said housing and extending therefrom at one side thereof and the clutch operating mechanism includes a clutch pedal also journaled in said housing and extending therefrom at the other side thereof, the clutch pedal being in alinement with and having its inner end rotatably supported by the inner end of the steering arm.

15. A dash assembly as set forth in claim 13 wherein the clutch operating mechanism includes a clutch lever pivotally supported from said housing beneath the same and extending thereinto for operation by another part of said mechanism, said lever being supported by a bracket extending downwardly from the lower part of the housing.

16. A dash assembly as claimed in claim 13, wherein the dash is formed with a seating portion adapted to receive and support the end of a fuel tank.

17. A dash assembly as claimed in claim 13, wherein the housing and dash are bodily removable from the transmission casing or chassis as a unit, together with the steering and clutch operating mechanisms supported thereby.

18. A dash assembly as claimed in claim 14, wherein the clutch operating mechanism comprises a clutch pedal journaled in said housing and a member connected to rotate with said pedal and having a cam adapted to engage and operate a pivoted clutch lever.

19. A dash assembly as claimed in claim 13, wherein the dash is provided with an integral steering column adapted to have its upper part support a steering shaft forming part of the steering mechanism, said dash and housing also being integral.

In testimony whereof I affix my signature in the presence of two witnesses.

HENRY FORD.

Witnesses:
CHAS. E. SORENSEN.
ERNEST KANDER.